United States Patent
Allen et al.

(10) Patent No.: US 11,023,595 B1
(45) Date of Patent: Jun. 1, 2021

(54) SYSTEM AND METHOD FOR PROCESSING ENCRYPTED SEARCH

(71) Applicant: Amazon Technologies, Inc., Seattle, WA (US)

(72) Inventors: Nicholas Alexander Allen, Kirkland, WA (US); Matthew John Campagna, Bainbridge Island, WA (US); Xianrui Jeri Meng, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 16/213,489

(22) Filed: Dec. 7, 2018

(51) Int. Cl.
| | |
|---|---|
| *G06F 21/60* | (2013.01) |
| *G06F 21/62* | (2013.01) |
| *G06F 16/248* | (2019.01) |
| *G06F 16/2455* | (2019.01) |
| *H04L 9/08* | (2006.01) |

(52) U.S. Cl.
CPC .......... *G06F 21/602* (2013.01); *G06F 16/248* (2019.01); *G06F 16/24553* (2019.01); *G06F 21/6227* (2013.01); *H04L 9/0897* (2013.01)

(58) Field of Classification Search
CPC ............. G06F 21/602; G06F 16/24553; G06F 16/248; G06F 21/6227; H04L 9/0897
See application file for complete search history.

(56) References Cited

U.S. PATENT DOCUMENTS

| | | | | |
|---|---|---|---|---|
| 5,032,989 | A * | 7/1991 | Tornetta | G06F 16/29 705/313 |
| 2009/0119252 | A1* | 5/2009 | Plestid | G06F 16/248 |
| 2012/0053829 | A1* | 3/2012 | Agarwal | G06F 16/24575 701/418 |
| 2014/0281514 | A1* | 9/2014 | Erofeev | H04L 9/088 713/165 |
| 2018/0039792 | A1* | 2/2018 | Ohara | H04L 9/0618 |
| 2018/0144152 | A1* | 5/2018 | Greatwood | G06F 21/6227 |
| 2019/0197255 | A1* | 6/2019 | Lehnhardt | G06F 16/2272 |
| 2020/0076578 | A1* | 3/2020 | Ithal | H04L 9/0825 |
| 2020/0136818 | A1* | 4/2020 | Jiang | G06F 21/6245 |
| 2020/0142993 | A1* | 5/2020 | Bodziony | G06F 16/2453 |
| 2020/0184082 | A1* | 6/2020 | Fu | H04L 9/008 |

* cited by examiner

*Primary Examiner* — Joseph P Hirl
*Assistant Examiner* — Stephen T Gundry
(74) *Attorney, Agent, or Firm* — Davis Wright Tremaine LLP

(57) ABSTRACT

A requester submits a request to perform an encrypted search that is received by an encrypted search provider. The encrypted search provider processes the request and produces a set of intermediate results which are loaded onto a mobile computer system that includes a mobile power source. The mobile computer system is shipped to the requester, and while in transit to the requester, the mobile computer system processes the intermediate results to produce a completed search result. After the mobile computer system arrives at the requester, the mobile computer system provides the completed search result to the requester.

22 Claims, 10 Drawing Sheets

SYSTEM AND METHOD FOR PROCESSING ENCRYPTED SEARCH

BACKGROUND

Encrypted search is a technique by which information can be retrieved from a data set without revealing contents of the data set or query to a service provider. By using encrypted search techniques, privacy and security may be improved. However, existing methods for encrypted search may have high computational costs, particularly when large data sets are involved. As a result, there can be a substantial processing delay in generating the results once the query has been received from the requester. This, in addition to the combined transmission delays associated with receiving the query and transmitting the result, can make the use of encrypted search very time consuming for large datasets. Therefore, improving the overall performance of encrypted search is an important problem addressed in the present disclosure.

BRIEF DESCRIPTION OF THE DRAWINGS

Various techniques will be described with reference to the drawings, in which.

DETAILED DESCRIPTION

Figure 1:
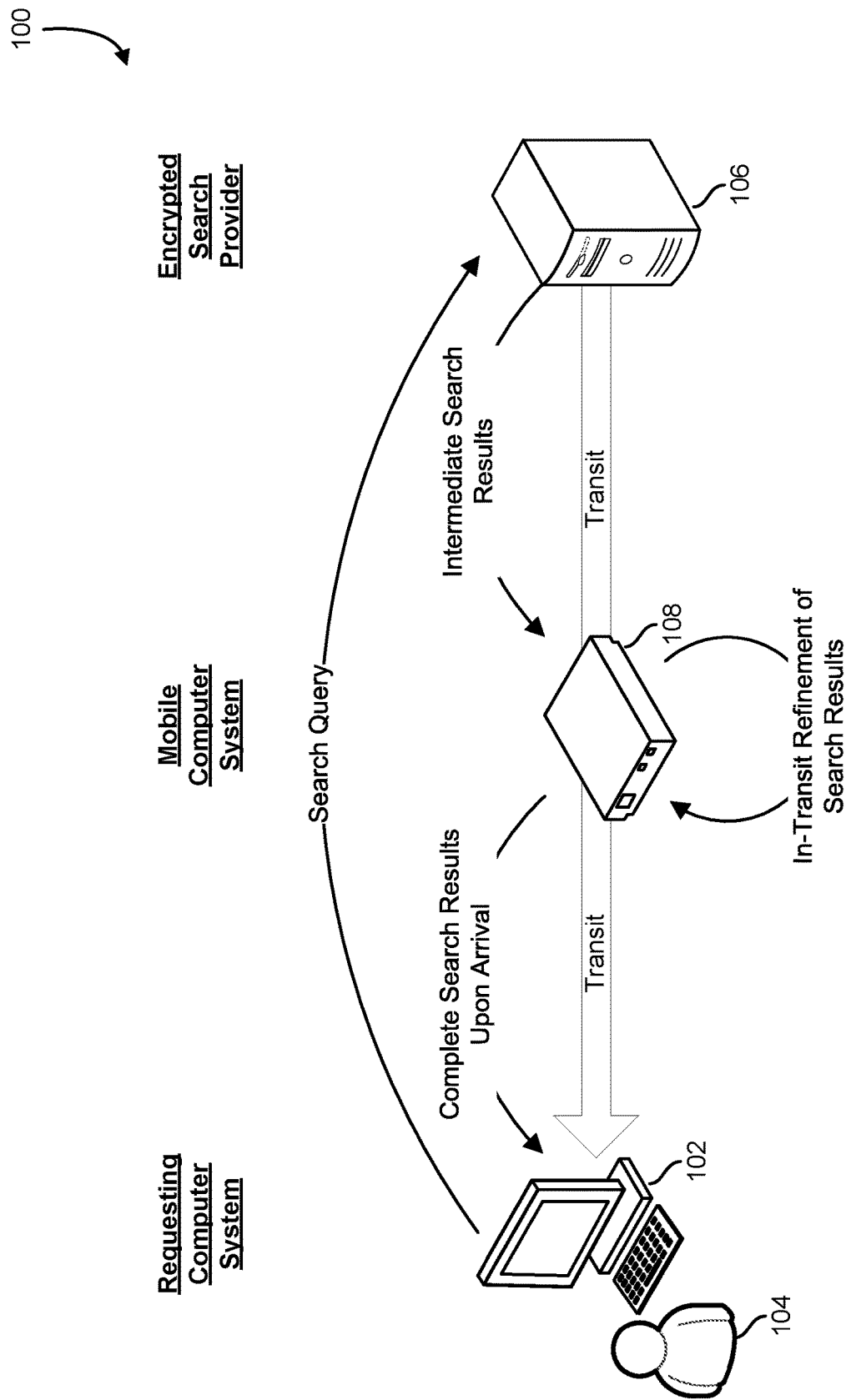
FIG. 1 illustrates an example of a system that performs an encrypted search, in an embodiment.

The present disclosure teaches an encrypted search operation using a mobile computer system that delivers the results of a search request to the requester. In this example, a requester submits a search to an encrypted search provider. The encrypted search provider generates a set of intermediate results associated with the search, which are stored on the mobile computer system. The mobile computer system can be a battery-operated system that can be physically shipped to the requester. While in transit, the mobile computer system can process the intermediate results to produce a set of completed results. When the mobile computer system arrives at the requester, the mobile computer system can provide the completed results to the requester, thus improving query processing times and efficiency.

Encrypted search is a technique by which information can be retrieved from a data set without revealing the contents of the data set or search to the encrypted search provider computer system. Many encrypted search methods have high computational costs, and therefore the use of encrypted search often introduces substantial latency in returning search results. When searching large data sets, returning the results to the requester via a computer network may introduce additional latency due to bandwidth limitations of the computer network. As the size of the data set and the search result increases, it becomes increasingly advantageous to use a physical transport mechanism when sending the search results from the encrypted search provider computer system to the requester, rather than sending the results via a computer network. A physical transport mechanism can be a tangible computer readable medium that can be physically transported between the encrypted search provider computer system and the requester. For example, a physical transport mechanism can be a USB memory stick, an SD memory card, a hard disk drive, an optical storage disk, or a device or assembly that includes any of the above. In general, data can be written onto the physical transport mechanism using a high-speed interface, and the physical transportation introduces a fixed latency (typically 1 to 5 days) while the physical transport medium is transported to the requester.

In various examples, the latency associated with performing an encrypted search and returning the search results to the requester is reduced by loading an intermediate result onto a mobile computer system that acts as a physical transport medium for the results, and the mobile computer system can process the intermediate result into a complete result (but is not limited to doing so) while in transit to the requester. When the mobile computer system arrives at the requester, the requester downloads the complete results from the mobile computer system. By performing the processing of the intermediate result while the physical transport medium is in transit to the requester, overall latency of the encrypted search process is reduced.

In various implementations, the mobile computer system includes a memory containing executable instructions, one or more processors, or non-transitory computer readable media containing an intermediate result provided by the encrypted search provider computer system. The mobile computer system can include a power source, such as a battery, that allows the computer system to operate while it is in transit to the requester. In some examples, the mobile computer system includes a variety of environmental sensors and battery monitoring circuitry that allow the mobile computer system to adapt operation of the computer system to environmental conditions. In still other embodiments, the power source can power into a transportation device for the mobile computer system.

When a search request is received by the encrypted search provider computer system, the encrypted search provider computer system partially processes the search request to produce a set of intermediate results. In one example, the encrypted search provider computer system performs a fast search preprocessing phase, the results of which are refined by the mobile computer system during transport. When a new data record is inserted into the data set to be searched, two indices, an aggregate index and a full index, are updated by the encrypted search provider computer system. The full index is an index that allows for the data record to be uniquely identified and retrieved during encrypted search. The aggregate index bundles together multiple data records allowing a non-exact collection of data records to be retrieved during encrypted search, the non-exact collection including at least the correct records. Due to the nature of encrypted search algorithms, the aggregate index can generally be searched much more quickly than the full index. When a query is received, the encrypted search provider computer system uses the aggregate index to select a portion of the full index and a portion of the encrypted data to load onto the mobile computer system. The mobile computer system then searches the portion of the full index while in transit to select some portion of the encrypted data to provide as search results when the mobile computer system is received by the requester.

Certain embodiments may be capable of achieving certain advantages, including some or all of the following: (1) the latency associated with providing search results to the requester is reduced because production of the final result is performed at least partially in parallel with shipment of the data to the requester, (2) scalability of the search provider is improved because the fleet of mobile computer systems provides increased computing capacity in proportion to the number of queries performed, and (3) the resulting improvement in performance makes encrypted search viable in a larger number of situations leading to increased security and privacy.

FIG. 1 illustrates an example of a system 100 that performs an encrypted search, in an embodiment. The system 100 includes a requesting computer system 102 operated by a user 104, an encrypted search provider 106, and a mobile computer system 108. The requesting computer system may be a personal computer system, a laptop computer system, a tablet computer system, a mobile computing device, a cell phone, a virtual computer system, a network service, or computing device capable of communicating with the encrypted search provider 106. The encrypted search provider 106 may be a server computer system, server cluster, serverless runtime, virtual computer system, network service, computing appliance, or computing device. In some implementations, the requesting computer system 102 and the encrypted search provider 106 are connected via a computer network such as the Internet, an intranet, or wireless service provider. The mobile computer system 108 is a portable computer system, handheld computer system, tablet computer system, laptop computer system, or other physical computing device capable of being operated using a mobile power source. The mobile computer system 108 includes a mobile power source such as a battery, high-power capacitor, or generator that allows the mobile computer system 108 to perform computations while in transit from the encrypted search provider 106 to the requesting computer system 102.

The present disclosure refers to various computing devices. In various examples, a computing device includes one or more processors and a memory for storing executable instructions that may be executed by the one or more processors. Execution of the instructions by the one or more processors causes the computing device, or the system as a whole, to perform various operations. A particular device may include one or more services, software modules, or software components. A service, module, or component is generally comprised of a particular subset of the executable instructions that, as a result of being executed, causes the system to perform operations associated with a particular system feature or function. As will be readily understood by those of ordinary skill in the art, referring to a service, module or component performing an action or operation indicates that the instructions that comprise the service module or component are executed by a processor which causes the system to perform the action. A computing device may include a non-volatile data storage device such as a hard disk drive, optical disk drive, flash drive, or battery backed memory device.

In the example illustrated in FIG. 1, the requesting computer system 102 generates a request to perform an encrypted search operation. The requesting computer system 102 submits the request to the encrypted search provider 106. In some examples, the request is submitted to the encrypted search provider 106 via a computer network such as the Internet. In some examples, the request is submitted in the form of a web service request. Upon receiving the request, the encrypted search provider 106 processes the request to produce a result, which may be an intermediate result. In one implementation, the encrypted search provider 106 maintains an aggregate index and a full index for an encrypted data store. The intermediate result is produced by processing the request using the aggregate index to identify a portion of the full index and a portion of the encrypted data store that may be used to produce the final search result. In some implementations, the encrypted search provider 106 generates a set of scripts, programs, or executable instructions that as a result of being executed by the mobile computer system 108, causes the mobile computer system to process the intermediate result into the final encrypted search result.

In some examples, the encrypted search provider 106 selects the mobile computer system 108 from a set of available mobile computer systems that are available to the encrypted search provider 106. A particular mobile computer system may be selected for use based on an amount of battery power available, amount of processing power available, and an amount of data storage available to the particular computing device.

The encrypted search provider 106 performs a number of configuration operations before the mobile computer system 108 is shipped to the requester. In some examples, the encrypted search provider 106 initializes the mobile computer system 108 by applying an image to a storage device on the mobile computer system 108. In some examples, the encrypted search provider 106 stores the intermediate search result (such as the portion of the encrypted data store and the portion of the full index) to a data storage device on the mobile computer system 108. In another example, the encrypted search provider 106 stores the set of scripts, programs, or executable instructions that instruct the mobile computer system 108 to convert the intermediate result into the final encrypted search result.

Once configured by the encrypted search provider 106, the mobile computer system is shipped to the location of the requesting computer system 102 or user 104. While in transit, the mobile computer system 108 processes the intermediate search results to produce the final result. In some examples, the mobile computer system 108 executes a set of scripts, programs, or executable instructions provided by the encrypted search provider 106. In other examples, the mobile computer system 108 completes the generation of the final search results prior to arriving at its destination. After arriving at the destination, the mobile computer system 108 provides the final result to the user 104 or requesting computer system 102. By performing a portion of the generation of the final search result while in transit, transfer of the results, and processing of the results can occur in parallel thereby reducing the total latency associated with the encrypted search request.

Figure 2:
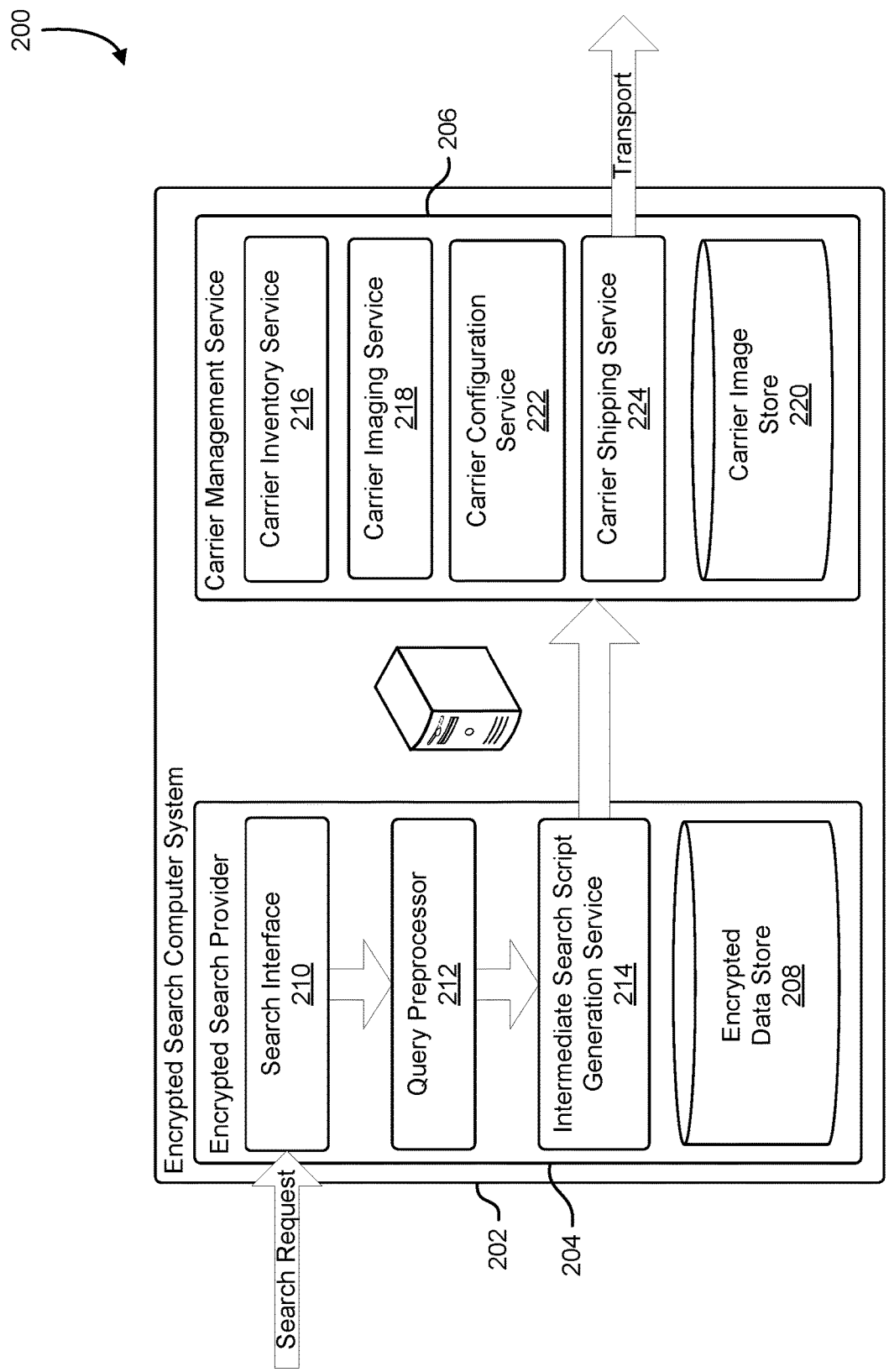
FIG. 2 illustrates an example of a computer system that provides encrypted search results, in an embodiment.

FIG. 2 illustrates an example of a computer system 200 that provides encrypted search results, in an embodiment. An encrypted search computer system 202 obtains an encrypted search request from a client computer system and returns a set of encrypted search results. In various examples, the encrypted search request may be obtained by receiving, via a computer network, a web request describing the request. In other examples, obtaining, acquiring, or receiving a request, result, or information may be accomplished by the acquiring entity reading a memory storage location that retains the information associated with the request or result. Encrypted search computer system 202 may be a server computer system, server cluster, virtual computer system, computer runtime, container runtime, web service, or computing appliance capable of reading and processing computer-executable instructions. The encrypted search computer system 202 includes a memory for storing the computer-executable instructions, and one or more processors. When the one or more processors execute the computer-executable instructions, the computer-executable instructions cause the encrypted search computer system 202 to perform various operations described below. In the present document, reference is made to various software services, modules, or components of the encrypted search computer system 202. When referring to such services, modules or components as performing an action, the computer system (such as the encrypted search computer system 202) performs the action as a result of the one or more processors performing the computer-executable instructions associated with the service, module, or component of the encrypted search computer system 202. The present document may refer to a service, component, or module performing an action as a shorthand for the computer system performing the action as a result of running the computer-executable instructions associated with said service, component, or module.

The encrypted search computer system 202 can include a non-volatile data storage device such as a hard disk drive, an optical disk drive, or flash memory device. The non-volatile data storage device can be used as storage for computer-executable instructions, program data, user data, image files, database files and indexes, and other information. The encrypted search computer system 202 may include a physical network interface that connects to one or more computer networks such as the Internet. The network interface may be an interface such as an Ethernet interface, token Ring interface, a Bluetooth interface, a Wi-Fi interface, or a fiber-optic interface. Encrypted search computer system 202 may include one or more peripheral interfaces such as Universal serial bus ("USB") interface, a FireWire interface, an HDMI interface, a video interface, a display port interface, and an audio input and output interface. Control over these interfaces, peripherals, and memory devices are generally managed by an operating system. The operating system imposes a structure on the physical devices to create logical services and devices such as a file system, a network application programming interface ("API") (such as Sockets or Winsock), a database API, and so on. Many such services are well known by those skilled in the art and will not be described in detail in the present document.

In the example illustrated in FIG. 2, the encrypted search computer system 202 includes an encrypted search provider 204 and a carrier management service 206. The encrypted search provider 204 facilitates access to an encrypted data store 208. The encrypted data store 208 is a database or data store maintained in an encrypted format. The encrypted search provider 204 maintains a number of search indexes used to perform search operations on the data stored in the encrypted data store 208. In some implementations, the encrypted search provider 204 maintains an aggregate index and a full index. The full index is an index that allows for each data record in the encrypted data store 208 to be uniquely identified and retrieved in response to an encrypted search request. The aggregate index is a non-granular index that bundles together a plurality of data records allowing a collection (generally a superset) of data records to be retrieved during an encrypted search, the non-exact collection including at least the correct records. The encrypted search provider 204 includes a search interface 210. The search interface 210 provides an interface to client computer systems for submitting encrypted search requests. In some implementations, the search interface 210 is a web request interface. In some examples, the search interface 210 authenticates the identity of the requester, and authorizes the search request based on a set of access policies stored on the encrypted search computer system 202.

The encrypted search provider 204 includes a query preprocessor 212. The query preprocessor obtains the raw query from the search interface 210, and uses the aggregate index to select a portion of the full index and a portion of the encrypted data to load onto the mobile computer system. The portion of the full index and the portion of the encrypted data are selected so as to be sufficient to generate a result for the received search request. In various examples, the selected portions of the full index are sufficient because the construction of the aggregate index links to portions of the full index that include the final result (such as a superset of the final result). Processing of the selected portions of the full index is therefore sufficient to produce the final result. In various examples, because the aggregate index is smaller, the production of the intermediate result (which includes the selected portions of the full index) takes less time that processing the entire full index directly. This intermediate result is transferred to an intermediate search script generation service 214.

The intermediate search script generation service 214 receives the intermediate result from the query preprocessor 212 and obtains a set of executable instructions that as a result of being executed, causes the system to convert the intermediate result into a final result for the received query. The set of executable instructions may be a set of scripts, intermediate language files, interpretable statements, object code, absolute code, machine language, or other executable instructions that are compatible with a mobile computer system. In some implementations, the set of executable instructions is comprised of source code or intermediate language statements that can be compiled into executable instructions that are compatible with a variety of different computing platforms. The intermediate result and the executable instructions are transferred to the carrier management service 206.

In various embodiments, the carrier management service 206 selects a mobile computer system from a number of mobile computer systems available to the encrypted search computer system 202, configures the selected mobile computer system, and prepares the selected mobile computer system for shipment to the requester. For additional information describing a mobile computer system see FIG. 3 and the associated description. The carrier management service 206 includes a carrier inventory service 216, a carrier imaging service 218, a carrier image store 220, a carrier configuration service 222, and a carrier shipping service 224. The carrier inventory service 216 maintains a database of mobile computer systems. For each mobile computer system, the carrier inventory service 216 records the location of the mobile computer system (at the search provider, at a requester, or in transit to a requester), the computing resources available to the mobile computer system, and a battery capacity and charge level of the mobile computer system. When a request for a mobile computer system is received by the carrier management service 206, the carrier inventory service 216 evaluates the request and then selects a mobile computer system from the set of mobile computer systems that are located at the search provider, and have the necessary amount of processing power, memory, storage capacity, battery capacity, and charge level to complete the processing of the intermediate result and produce the complete search result. If no available mobile computer system has sufficient resources to complete processing the intermediate result, the mobile computer system may be selected with a lower level of resources, and processing may be completed after the mobile computer system arrives at the requester's location. In some aspects, a single mobile computer system can constitute sufficient resources, still in others a set of more than one mobile computer system can be orchestrated to function together to comprise sufficient resources to complete the result.

In some examples, the carrier inventory service 216 identifies a selected mobile computer system to the carrier imaging service 218. The carrier imaging service 218 selects an image file from a carrier image store 220, and applies the selected image file to the storage device of the mobile computer system. The carrier image store 220 may include a variety of images that correspond to a variety of different mobile computer system hardware configurations. By applying an image to the mobile computer system, the carrier management service 206 resets the selected mobile computer system to a known state and clears old information from the device. The carrier imaging service 218 identifies the image mobile computer system to the carrier configuration service 222.

In various examples, the carrier configuration service 222 receives the executable instructions and intermediate search result from the encrypted search provider 204. The carrier configuration service 222 stores the intermediate search result and the executable instructions to a storage device on the mobile computer system, and causes the mobile computer system to begin processing the intermediate result into the final encrypted search result. In some implementations, the carrier configuration service 222 launches a remote procedure call on the mobile computer system to cause the mobile computer system to begin processing the immediate results. Thus, mobile computer system can have a temporal dimension to processing results, beginning at a first time after a request and before deployment to the requesting system 102 or after such deployment, as is appropriate for a task to be performed.

In some implementations, the carrier management service 206 includes a carrier shipping service 224 that manages the shipment of the configured mobile computer system to the requester. The carrier shipping service 224 acquires information from the encrypted search provider 204 identifying the requester. In some implementations, the carrier shipping service 224 estimates the shipping time required for the mobile computer system to arrive at the requester based on the distance between the encrypted search computer system 202 and the requester, and the amount of time estimated to process the intermediate result into the final encrypted search result. Based on the estimated processing time, the carrier shipping service 224 may select an appropriate mode of shipment such as overnight, today, three-day, or ground shipping, to allow sufficient time for the processing to be completed before the mobile computer system arrives at the requester. In some implementations, the amount of processing time depends on the processing capabilities of the selected mobile computer system. In some examples, a particular shipping service may be selected from a set of possible shipping services based on cost and projected shipping time. In some examples, the carrier shipping service 224 generates a shipping label for the selected shipping service, and prints the shipping label to be applied to the mobile computer system.

In one example, an operator of the encrypted search computer system 202 retrieves the configured mobile computer system, and disconnects it from the network and line power. The mobile computer system, using a portable power source, continues processing the intermediate results. The operator packs the mobile computer system while it is operating, into a box, applies a printed shipping label (or in some other embodiments, a digital label), and transfers the package to the selected shipping service for shipment to the requester. While in transit, the mobile computer system then searches the portion of the full index to select some portion of the encrypted data to provide as search results when the mobile computer system is received by the requester. When the mobile computer system arrives at the requester, the requester downloads the search results from the mobile computer system, and returns the mobile computer system to the encrypted search provider. By completing the processing of the search results while in transit, overall latency of processing the search request is reduced.

Figure 3:
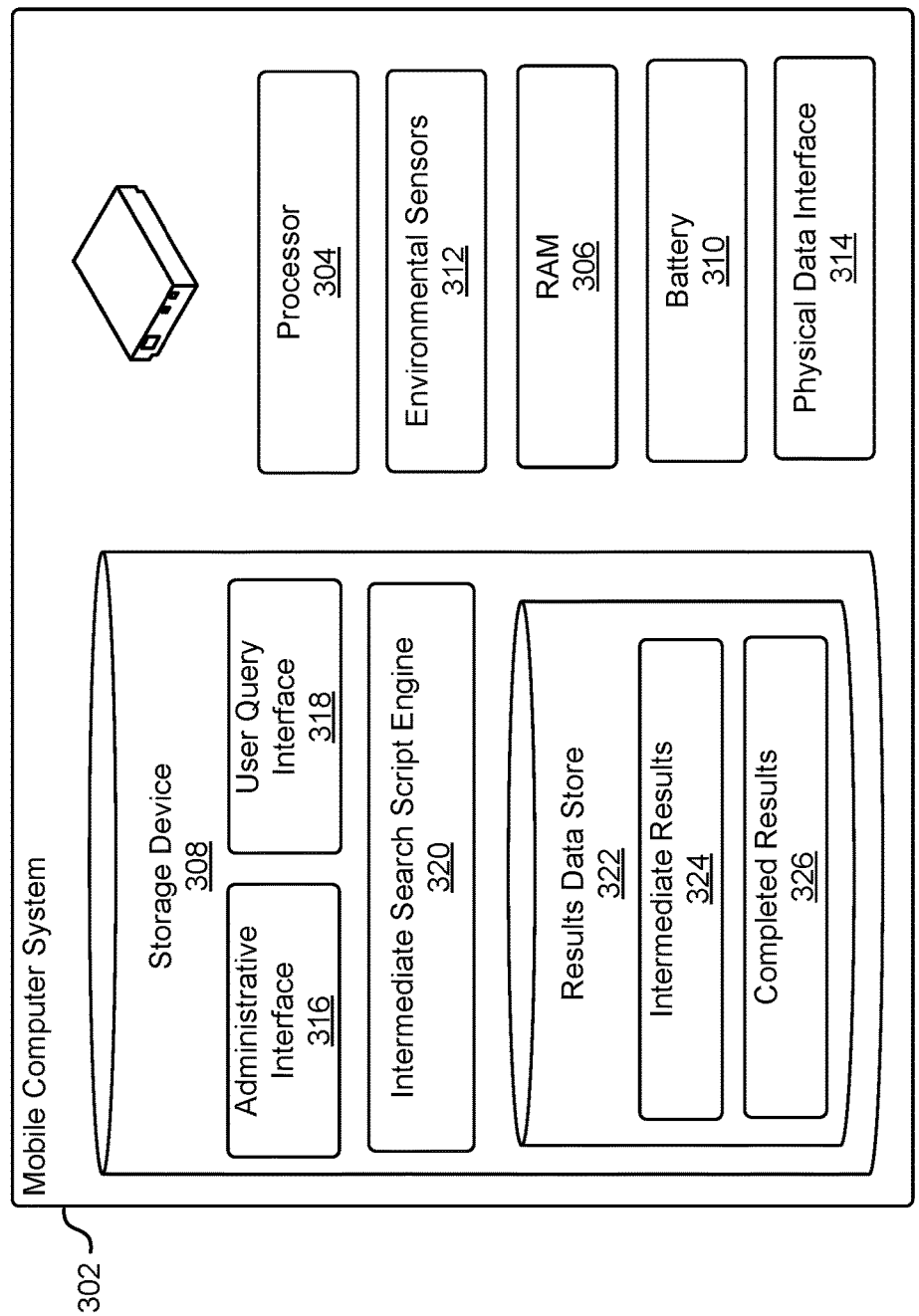
FIG. 3 illustrates an example of a mobile computer system that processes intermediate search results while in transit to the requester, in an embodiment.

FIG. 3 illustrates an example of a mobile computer system that processes intermediate search results while in transit to the requester, in an embodiment. A block diagram 300 illustrates the architecture of the mobile computer system 302 that can be used to transport search results to a requester. The mobile computer system 302 is a processing device capable of converting a set of intermediate results provided by an encrypted search provider into a completed set of results while the mobile computer system 302 is physically transported to the requester. The mobile computer system 302 may be implemented using a personal computer system, laptop computer system, tablet computer system, handheld computer system, computing appliance, embedded microcontroller, or battery-operated computing device. In the example illustrated in FIG. 3, the mobile computer system 302 includes a processor 304 capable of executing executable instructions that cause the mobile computer system 302 to process the intermediate search results. The executable instructions may be stored in and executed from a random access memory 306. The random access memory can be static RAM, dynamic RAM, flash memory, SDRAM, DDR SDRAM, or data storage device that is addressable by the processor 304. The mobile computer system 302 includes a storage device 308. The storage device 308 may be a hard disk drive, a flash memory device, an optical storage device, a battery backed memory device, or a non-volatile storage device.

The mobile computer system 302 includes a battery 310 that allows the mobile computer system 302 to operate while disconnected from line power. The battery 310 can be a single-use battery such as an alkaline battery or a rechargeable battery such as a nickel metal hydride, nickel cadmium, lithium-ion, or lithium-ion polymer battery. In some implementations, the battery 310 may be a high-capacity capacitor. The battery 310 stores an amount of energy that can be represented by a charge level. In some implementations, the battery 310 includes a sensor that allows the charge level to be read by the processor 304.

In some examples, the mobile computer system 302 includes a set of environmental sensors 312. The environmental sensors may include one or more of a mechanical shock sensor such as a piezoelectric sensor, an accelerometer, a temperature sensor, a moisture sensor, a humidity sensor, a flux magnetometer (or digital compass), and an ambient light sensor. The environmental sensors 312 are readable by the processor 304, and allow the mobile computer system 302 to adjust operation based on environmental conditions. For example, if the temperature exceeds a threshold level, the mobile computer system 302 may shut down or reduce power consumption to prevent damage to the device. Various kinds of hard disk drives are adversely affected by humidity, so in some examples, if the mobile computer system 302 detects a level of humidity that would adversely affect the storage device, the mobile computer system may shut down the storage device until the humidity level is reduced. Shock and vibration can also cause damage to storage devices, particularly mechanical storage devices. In some examples, if excessive shock or G forces are detected, the mobile computer system 302 prevents the storage device 308 from performing write operations. In some examples, the mobile computer system 302 spins down a disk drive and parks the heads in a safe area if excessive shock or G forces are detected.

In some examples, the environmental sensors 312 may be used to detect an intrusion attempt. For example, if ambient light is detected inside the package containing the mobile computer system 302, the mobile computer system 302 may interpret this as an opening of the package and demand authentication from the recipient. If authentication is not received, the mobile computer system assumes that the opening of the package was unauthorized and takes steps to delete the intermediate query results, and any completed query results from the storage device 308.

The mobile computer system 302 includes a physical data interface 314. The physical data interface 314 may be a wired interface such as a Universal serial bus ("USB") interface, a parallel interface, a serial interface, a FireWire interface, a fiber-optic interface, a serial Advanced Technology attachment ("SATA") interface, or a Lightning interface. The physical data interface 314 may be a wireless interface such as a Wi-Fi interface, a Bluetooth interface or an infrared interface. In some implementations, the physical data interface 314 is a network interface such as an Ethernet interface. The physical data interface 314 is used by the encrypted search provider to load the intermediate search results onto the mobile computer system 302, and by the requester to download the completed search results when the mobile computer system 302 arrives at the requester's location.

In various embodiments, information is stored on the storage device 308. Information stored on the storage device 308 may include executable instructions that implement an administrative interface 316, a user query interface 318, and an intermediate search script engine 320. The administrative interface 316 implements functionality that causes the collect mobile computer system 302 to interface with the encrypted search provider. The administrative interface 316 provides status information such as battery level, available memory, and available storage space to the encrypted search provider so that the encrypted search provider can select an appropriate mobile computer system for shipment of results to a particular requester. The user query interface 318 implements functionality that allows the recipient to download the completed search results from the mobile computer system 302. The user query interface 318 may include authentication functionality that confirms the identity of the requester upon receipt of the mobile computer system 302. The intermediate search script engine 320 manages the execution of instructions by the processor 304 that convert the intermediate search results into a completed search result usable by the recipient. In some implementations, the intermediate search script engine 320 implements a scripting language, interpreter, or compiler that converts an intermediate language, interpreted language, or source code provided by the encrypted search provider into instructions that are natively executable by the processor 304.

The storage device 308 also includes a results data store 322. The results data store 322 holds a set of intermediate results 324 which are written to the results data store 322 by the encrypted search provider. The results data store 322 also holds the completed results 326 which are generated by the intermediate search script engine 320. When the mobile computer system 302 arrives at the requester, the requester connects to the system via the user query interface 318 and downloads the completed results 326.

In one example, when a request to perform an encrypted search is received by the encrypted search provider, the encrypted search provider queries each mobile computer system in the fleet of mobile computer systems using the administrative interface 316 to determine the computing resources available to each mobile computer system, and the amount of battery power available to each mobile computer system. Based on estimates of the resource requirements determined from the search request and the resources and power available to each mobile computer system, the encrypted search provider selects a particular mobile computer system for processing the intermediate results (such as the mobile computer system 302). The encrypted search provider generates an intermediate result and a set of scripts, source code, or other information from which executable instructions can be determined, and writes this information to the storage device 308 on the mobile computer system 302. The encrypted search provider then causes the mobile computer system 302 to be disconnected from line power and shipped to the requester.

While the mobile computer system 302 is in transit to the requester, the intermediate search script engine 320 processes the scripts, source code, or executable instructions provided by the encrypted search provider to convert the intermediate results 324 into the set of completed results 326 as described elsewhere in the present document. The mobile computer system 302 may accelerate, decelerate, or suspend processing while in transit based on information received from the environmental sensors 312 or battery monitoring circuitry included with the battery 310. Upon arrival at the requester, the requester connects to the mobile computer system 302 via the physical data interface 314 and extracts the completed results 326 using the user query interface 318.

Figure 4:
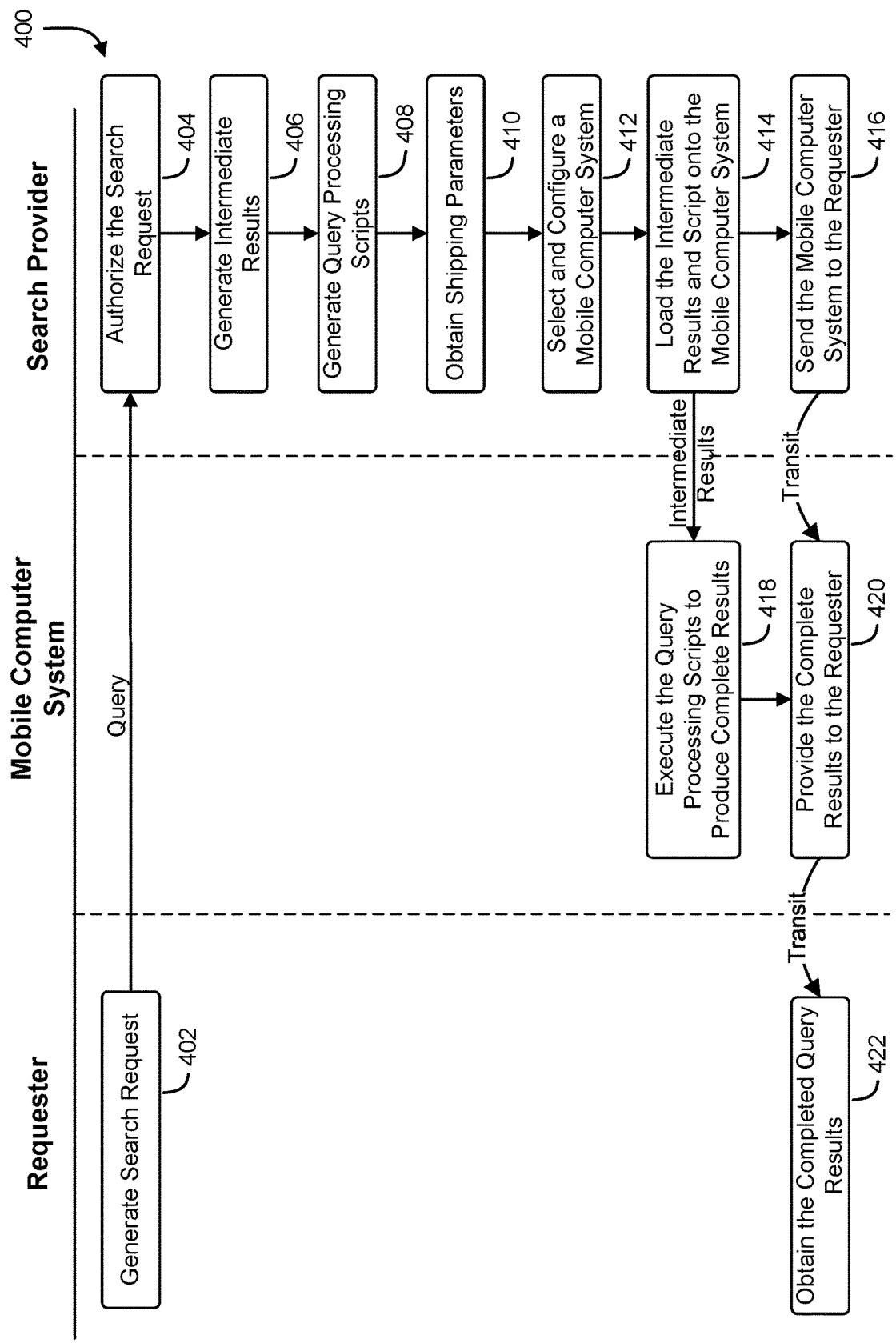
FIG. 4 illustrates an example of a process that, as a result of being performed by a requesting computer system, a mobile computer system, and a search provider, processes a search query submitted by the requesting computer system, in an embodiment.

FIG. 4 illustrates an example of a process 400 that, as a result of being performed by a requesting computer system, a mobile computer system, and an encrypted search provider, processes a search query submitted by the requesting computer system, in an embodiment. The process begins at block 402 with the requester generating a request to perform an encrypted search operation. The request is submitted to the encrypted search provider via a computer network such as the Internet. In some implementations, the search request is submitted in the form of a web request and the encrypted search provider provides the search service as a web service.

In some examples, at block 404, the encrypted search provider receives a search request from the requester, and authorizes the search request by confirming the identity of the requester and confirming that the requester is permitted to perform such search requests. In some implementations, the permissions granted to the requester are maintained by the encrypted search provider in a permissions database which is consulted when authorizing a request. At block 406, the search provider processes the request using an aggregate index to produce a set of intermediate results comprising a portion of a full index and a portion of the encrypted database maintained by the encrypted search provider. At block 408, the search provider generates a set of query processing scripts for converting the intermediate results into a completed result. In some implementations, the set of query processing scripts are generated in a format to be compatible with the mobile computer system. In other implementations, the set of query processing scripts are interpreted scripts, intermediate language scripts, or source code that are compiled by the mobile computer system into machine executable instructions that are compatible with the mobile computer system.

At block 410, the encrypted search provider obtains shipping parameters used to ship the mobile computer system to the requester. In some examples, the shipping parameters are provided by the requester with the request. In other examples, the search provider maintains a database of authorized requesters that includes shipping information that can be retrieved when a requester submits an encrypted search request. In some implementations, the encrypted search provider estimates the amount of time it will take to process the intermediate search results into the completed search results and selects a mode of shipping that will provide sufficient transit time for the processing to be completed. For example, if the search provider estimates that it will take three days to complete processing of the intermediate search results, the shipping method will be chosen that takes an estimated three days to arrive at the requester. In another example, if the search provider estimates that the processing will be complete in 24 hours, a next day express shipping service may be selected to ship the mobile computer system to the requester.

At block 412, the encrypted search provider selects and configures a mobile computer system for transporting the results back to the requester. In some embodiments, the mobile computer system is selected from the fleet of mobile computer systems that are available to the search provider. The fleet of mobile computer systems is connected to line power and a computer network that allows the search provider to communicate with the fleet of mobile computer systems. Each mobile computer system charges an onboard battery while connected to line power. To select a particular mobile computer system, the encrypted search provider may use a number of different methods. In one example, the mobile computer system analyzes the request to estimate an amount of processing power and memory required to generate the complete result. The search provider identifies those mobile computer systems sufficient processing power and memory, and a mobile computer system that has sufficient energy stored in its battery to complete processing of the intermediate result. In some examples, the search provider determines a weight for each potential mobile computer system and selects the lightest weight mobile computer system that has sufficient computing and battery resources in order to minimize shipping costs.

At block 414, the search provider loads the intermediate results and the generated scripts onto the mobile computer system, and sends 416 the mobile computer system to the requester. The search provider may send the mobile computer system by printing a shipping label and directing an operator to disconnect the mobile computer system from line power, affix the shipping label, and transfer the operational mobile computer system to the shipping service. At block 418, the mobile computer system upon receiving the intermediate results and generated scripts, executes the scripts causing the mobile computer system to process the intermediate results and begin producing the completed results. The mobile computer system continues processing as it is disconnected from power and shipped to the requester.

In some examples, the mobile computer system may complete processing of the intermediate results while still in transit to the requester. In other examples, the mobile computer system may not complete processing before the mobile computer system arrives at the requester. If processing is complete upon arrival, the mobile computer system provides 420 the completed results to the requester, and the requester obtains the completed query results 422. In some examples, if processing is not complete upon arrival, the mobile computer system can provide a second intermediate result to the requester, and production of the final result can be accomplished by the requester. In other examples, if processing is not complete upon arrival, the mobile computer system indicates that the processing is not complete. The requester waits until processing is complete, and the completed results are provided by the mobile computer system when the processing is complete.

Figure 5:
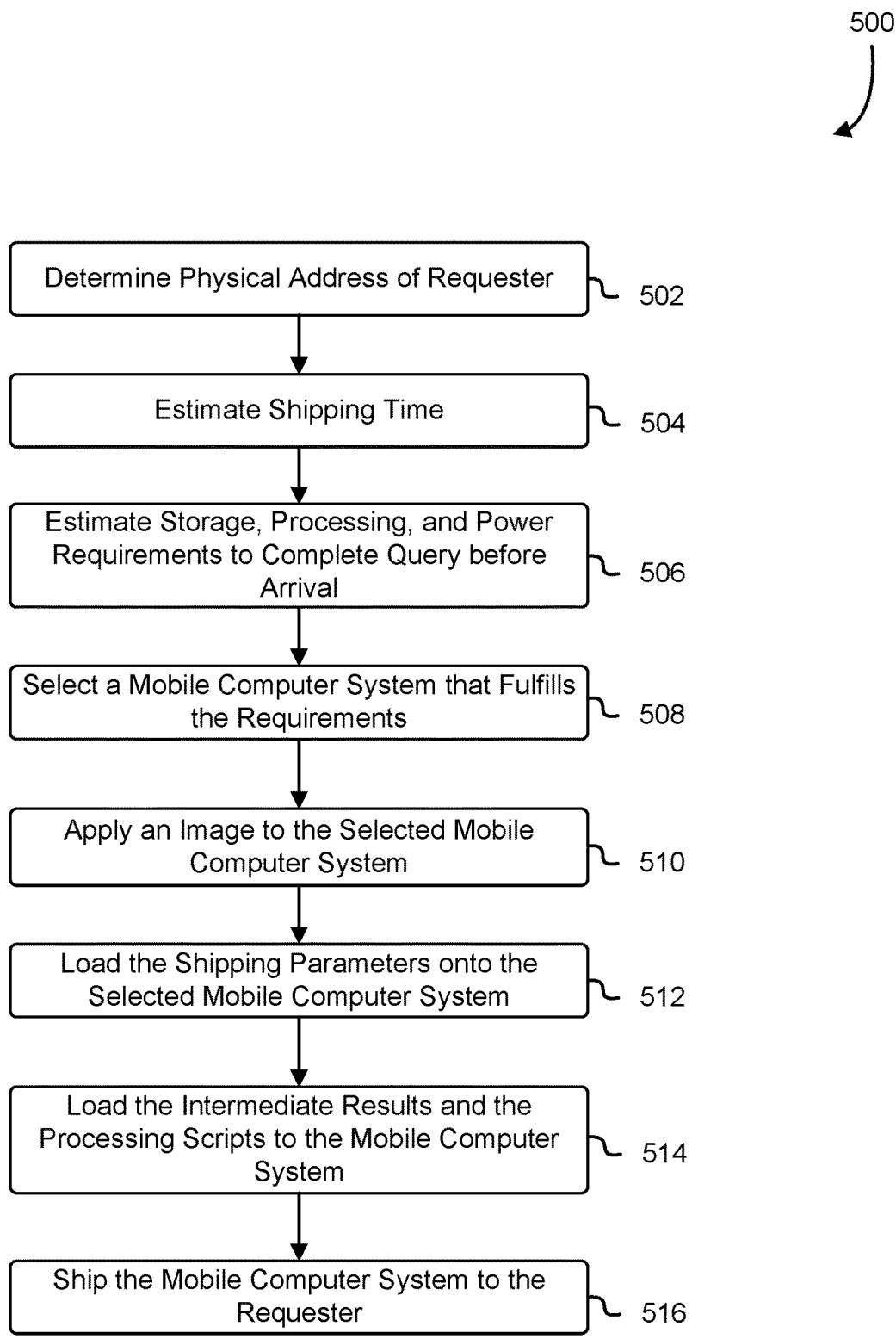
FIG. 5 illustrates an example of a process that, as a result of being performed by a search provider, provides intermediate search results to a mobile computer system, in an embodiment.

FIG. 5 illustrates an example of a process 500 that, as a result of being performed by an encrypted search provider, provides intermediate search results to a mobile computer system, in an embodiment. The encrypted search provider receives a request to perform an encrypted search from a requester. At block 502 the encrypted search provider determines a physical address associated with the requester. The physical address associated with the requester may be provided with the request, or may be maintained in a database by the encrypted search provider. At block 504, the encrypted search provider estimates the shipping time from the location where the mobile computer systems are stored and the requester's physical address. In various examples, shipping time may be estimated for various shipping services and for various shipping service levels. At block 506, the encrypted search provider estimates the amount of data storage space, processing power, and battery requirements needed to complete the processing of the intermediate results of the request. In some implementations, the encrypted search provider may perform additional processing of the intermediate results before loading the intermediate results onto the mobile computer system so that the amount of processing available on the mobile computer system is sufficient to complete the processing before the mobile computer system arrives at the requester. At block 508, based on the requirements determined above, the encrypted search provider selects the mobile computer system from an available fleet of mobile computer systems. The mobile computer system is selected so as to have sufficient computing, memory, and battery resources to complete processing of the intermediate results into the completed results before the mobile computer system arrives at the requester.

After selecting the mobile computer system, at block 510, the encrypted search provider applies an image to the storage device of the mobile computer system to initialize it to a known state. In some examples, the application of the image clears data from previous uses of the mobile computer system. A library of image files may be maintained by the encrypted search provider, and a particular image may be selected based on the particular hardware and configuration of the selected mobile computer system. In some examples, the encrypted search provider loads a set of shipping parameters onto the selected mobile computer system. The shipping parameters may include the estimated time of arrival, the current date and time, the mode of transportation, the final address for the mobile computer system, and authentication information that allows the mobile computer system to verify that the entity attempting to download the completed results is the requester. The authentication information may include a password, a digital signature, cryptographic key, or pin code that must be provided to the mobile computer system in order to enable downloading of the results. At block 514, the encrypted search provider loads the intermediate results of the request onto the mobile computer system. In some examples, the encrypted search provider loads a set of scripts, intermediate code, source code, or other executable instructions that instruct the mobile computer system to process the intermediate results onto a storage device of the mobile computer system. In some implementations, this causes the mobile computer system to begin processing the intermediate results.

At block 516, the encrypted search provider ships the selected mobile computer system to the requester. In some examples, the encrypted search provider prints a shipping label and directs an operator to affix the shipping label to the mobile computer system, and to transfer the mobile computer system to a shipping service. In some examples, the encrypted search provider uses a service provided by the shipper to track the progress of the mobile computer system as it is transported to the requester.

Figure 6:
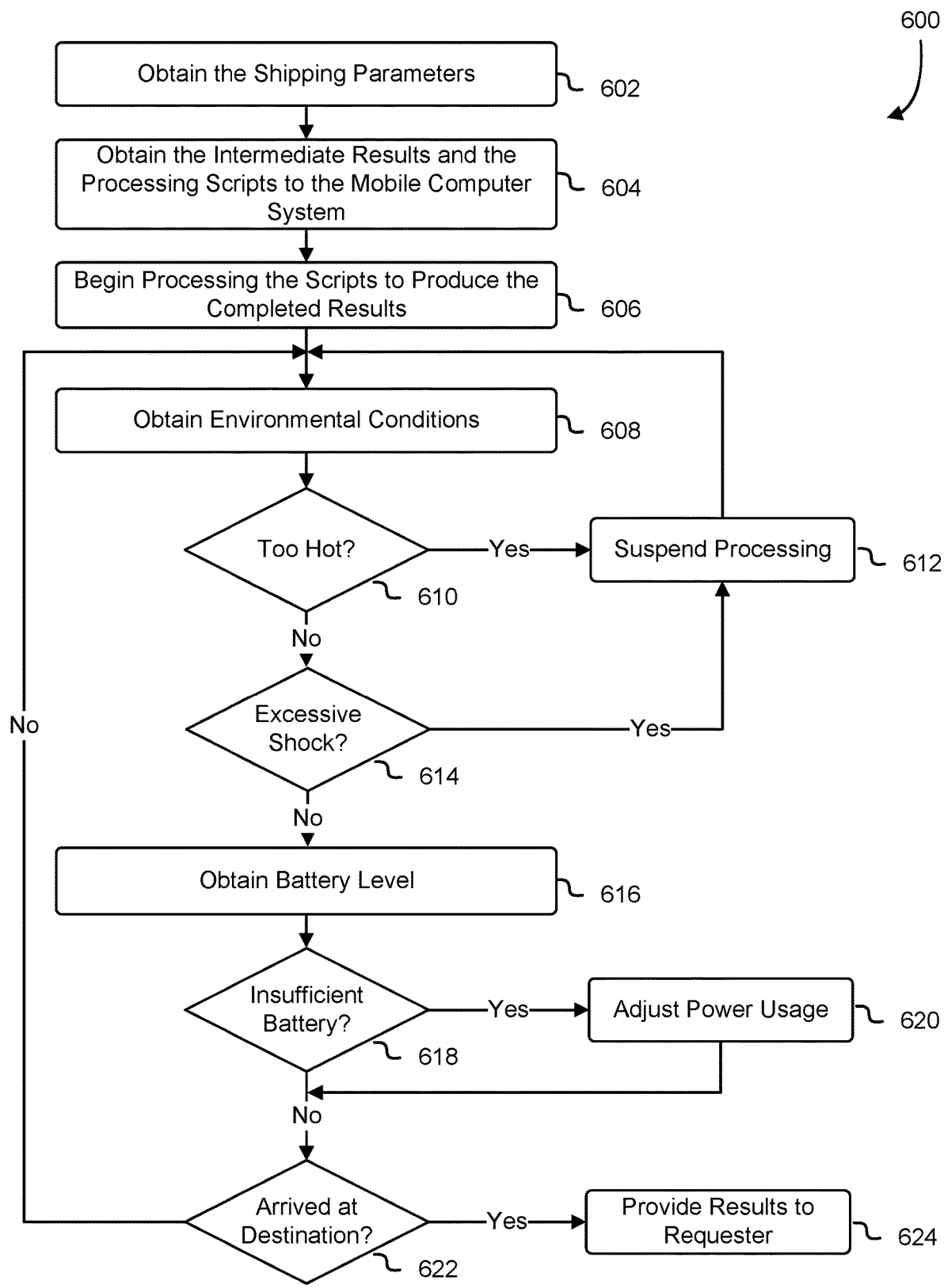
FIG. 6 illustrates an example of a process that, as a result of being performed by a mobile computer system, processes a set of intermediate search results, in an embodiment.

FIG. 6 illustrates an example of a process 600 that, as a result of being performed by a mobile computer system, processes a set of intermediate search results, in an embodiment. At block 602, the mobile computer system obtains the shipping parameters from the encrypted search provider. The shipping parameters may include such items as the estimated time of arrival at the requester, and a credential usable by the mobile computer system to confirm the identity of the requester upon arrival. At block 604, the mobile computer system obtains a set of intermediate results and processing scripts from the encrypted search provider. The intermediate results, in one embodiment, are results derived from the encrypted database using an aggregate index, and a portion of the encrypted database maintained by the encrypted search provider. In various implementations, the encrypted search provider provides executable instructions, scripts, source code, or intermediate code that can be executed to complete processing and intermediate results. In some examples, the mobile computer system receives source code which is compiled into a series of executable instructions that are compatible with the processor on the mobile computer system. In other examples, the mobile computer system receives an interpretable code or script file that can be interpreted by a service hosted by the mobile computer system. In other examples, the mobile computer system receives machine compatible executable instructions from the encrypted search provider which can be executed directly by the processor on the mobile computer system. At block 606, the mobile computer system begins executing the instructions provided by the encrypted search provider.

In various examples, the mobile computer system is disconnected from line power and from the local network that connects it to the encrypted search provider, and is shipped to the requester. While in transit, the mobile computer system continues processing the intermediate results to generate the completed search results which will be provided to the requester upon arrival. While in transit, at block 608, the mobile computer system obtains environmental conditions using a set of environmental sensors on the mobile computer system. In various implementations, the environmental sensors may include temperature sensors, moisture sensors, and shock and vibration sensors. At decision block 610, the mobile computer system compares the ambient temperature measured by the environmental sensors to a threshold value. The threshold value is determined to identify a maximum temperature at which operation of the mobile computer system can be safely maintained. As is known by those in the art, high temperatures can be detrimental to computing devices, data storage devices, and electronic components. In various implementations, if the measured temperature exceeds the threshold value, execution advances to block 612 and the mobile computer system suspends processing of the intermediate results. In some implementations, processing is slowed to reduce the power consumption (and therefore heat generation) of the mobile computer system. If the temperature is less than the threshold value, execution advances to decision block 614.

In an embodiment, at decision block 614, the mobile computer system measures the level of physical shock and G forces on the mobile computer system. If the amount of the shock and vibration exceeds a threshold amount that would threaten the integrity of the mobile computer system, execution advances to block 612 and processing of the intermediate results may be suspended. In some examples, mechanical storage devices may be secured until the shock and vibration is less than the threshold amount. If the level of shock and vibration does not exceed the threshold amount, execution advances to block 616.

At block 616, the mobile computer system measures the amount of energy stored in the onboard power source or battery. The mobile computer system examines the ratio of the amount of remaining processing and compares this ratio to the ratio of energy remaining in the battery. If the ratio of remaining energy is less than the ratio of processing remaining, the mobile computer system determines 618 that there is insufficient battery remaining to complete processing, and execution advances to block 620. At block 620, the mobile computer system adjusts power usage to perform processing more efficiently. Processing may be performed more efficiently by reducing the speed of the processor, or by reducing the number of processors allocated to processing the intermediate results.

At decision block 622, the mobile computer system checks to see if the mobile computer system has arrived at the requester's destination. Detection of arrival at the destination may be detected by detecting a connection to the physical interface of the mobile computer system, and by receiving credential information authenticating the requester to the mobile computer system. If arrival is not detected, execution returns to block 608 and environmental conditions may be measured again. If arrival is detected, the mobile computer system provides 624 the completed results to the requester. Results may be provided via a wired or wireless interface as described elsewhere in the present document. In some implementations, the mobile computer system requires authentication of the requester before providing the completed results.

Figure 7:
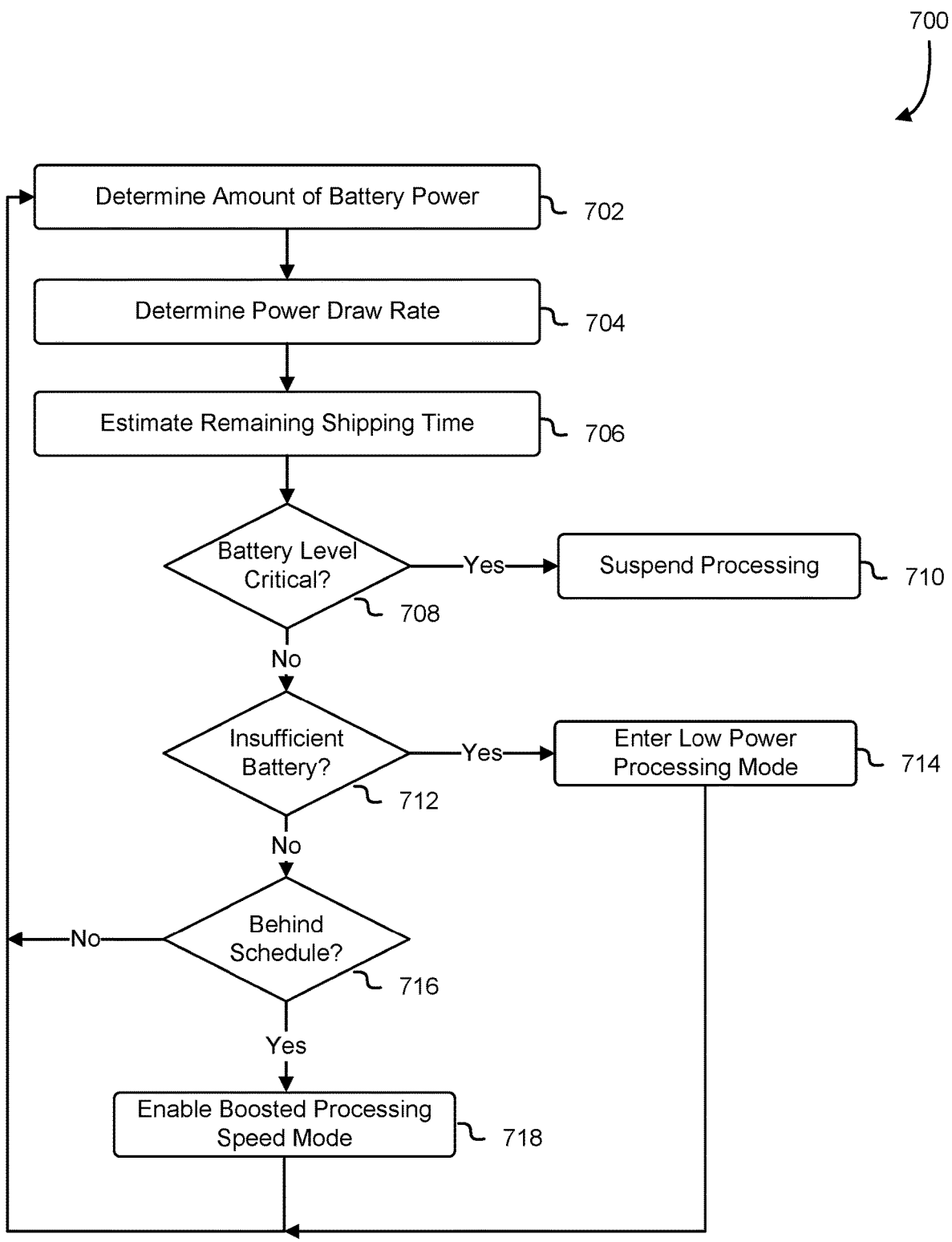
FIG. 7 illustrates an example of a process that, as a result of being performed by a mobile computer system, adjusts the operation of the system based on an amount of battery power available to the system.

FIG. 7 illustrates an example of a process 700 that, as a result of being performed by a mobile computer system, adjusts the operation of the system based on an amount of battery power available to the system. In an example, at block 702, the mobile computer system determines an amount of battery power available to the device. The amount of battery power may be represented as a percentage of a known total or an absolute amount of energy. At block 704, the mobile computer system determines a rate of energy consumption. The rate of energy consumption may be determined by measuring the power use through a power supply, or by estimating the rate of energy consumption by comparing the amount of time elapsed since the mobile computer system was disconnected from line power, and the amount of power used since that time.

At block 706, the mobile computer system uses the shipping information provided by the search provider and the amount of time since power was disconnected to estimate the amount of transit time remaining before arriving at the requester's location. Mobile computer system makes a number of operational decisions based on the level of the battery. At decision block 708, the mobile computer system determines if the battery level is critical such that processing failure is imminent. If the battery level is critical, execution advances to block 710 and processing of the intermediate result is suspended to prevent corruption of the current results. At decision block 712, the mobile computer system estimates the amount of battery required to complete processing. If the amount of battery required to complete processing is more than the current energy stored in the battery, execution advances to block 714 and the mobile computer system enters a low-power processing mode to conserve energy. A low-power processing mode may reduce the number of processor cores used for processing or may reduce the clock rate to improve the efficiency of the device. In some implementations, a low-power processing mode may include setting off various peripherals such as wireless networking and environmental sensors to conserve energy. In one implementation, a low-power operating mode is implemented by reducing the sampling rate of the environmental sensors.

At decision block 716, the mobile computer system estimates whether processing will complete before the system arrives at the requester's location. To estimate whether the system will arrive in time, the mobile computer system estimates the time remaining based on the estimated shipping time provided by the encrypted search provider and the elapsed time. If the ratio of processing remaining is greater than the ratio of the shipping time remaining, the mobile computer system determines that processing is behind schedule and execution advances to block 718. At block 718, the mobile computer system boosts processing speed by enabling more processor cores, and increasing clock speed if necessary to complete the search request before arrival. In some implementations, processing speed may be increased by allocating additional memory resources for caching the encrypted data set and search index. If processing is not behind schedule, execution returns to block 702 and battery monitoring continues.

Figure 8:
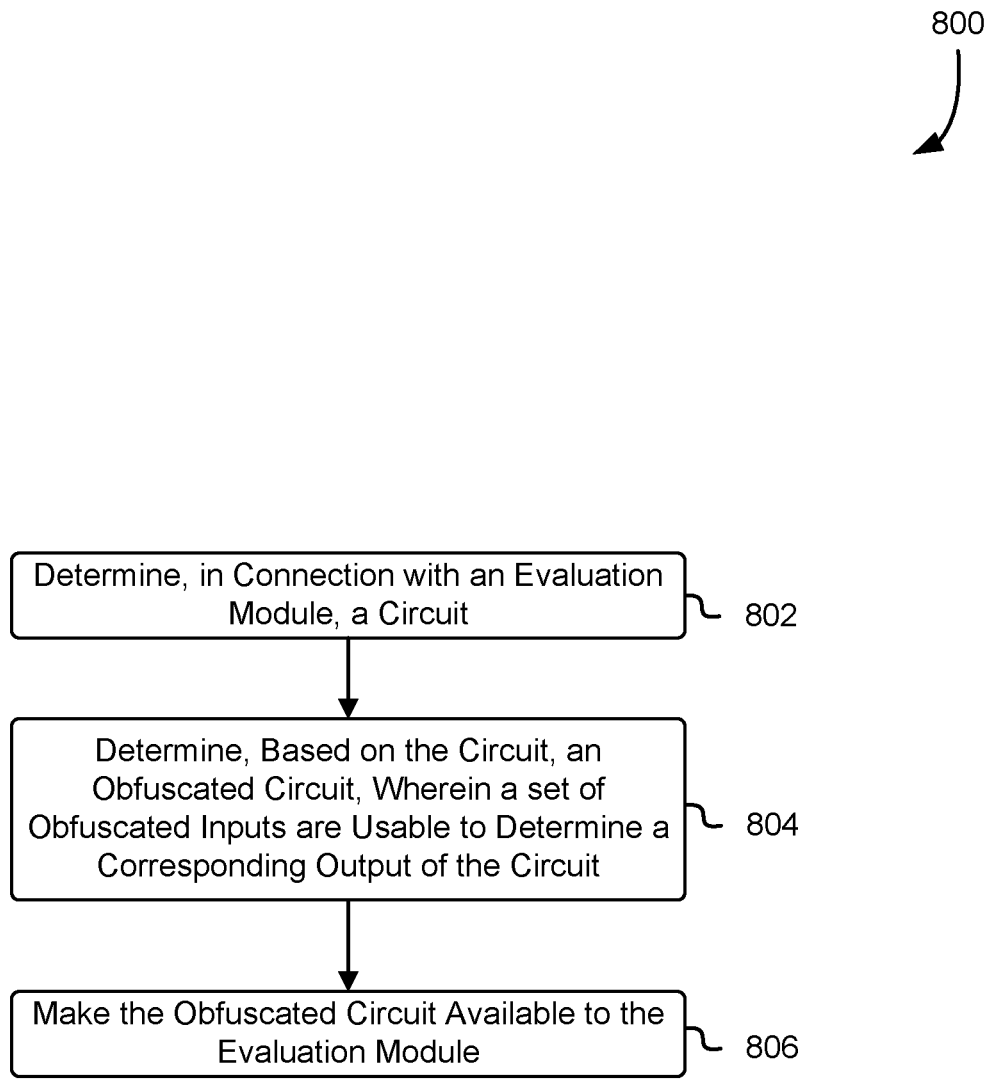
FIG. 8 shows an illustrative example of a process for performing at least part of a multi-party computation according to a cryptographic protocol that preserves the privacy of a data stream utilized to perform data processing and data analytics, in accordance with an embodiment.

FIG. 8 shows an illustrative example of a process 800 for performing at least part of a multi-party computation according to a cryptographic protocol that preserves the privacy of a data stream utilized to perform data processing and data analytics, in accordance with an embodiment. Some or all of the process 800 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 800 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 800 may be implemented at least in part by a garbler module. The process may be implemented in connection with the process described in FIG. 9, according to a cryptographic protocol that preserves the privacy of a data stream utilized to perform data processing and data analytics, in accordance with an embodiment.

The system, in an embodiment, determines 802, in connection with an evaluation module, a circuit. The circuit may be determined by a user selecting a particular program or function to perform via a user interface. In some examples, the circuit may be determined based on parameters of a search request. In an embodiment, the system receives a web API command indicating a program to run and constructs a circuit to perform the indicated program. For example, the request may include a parameter for an enumerated data type that indicates various types of programs and circuits supported by the system. The evaluation module may be implemented by any suitable computer system. In an embodiment, computing entities that implement a garbler module and an evaluation module mutually agree upon the circuit using any suitable protocol—for example, the first computing entity may generate the circuit and submit it to the second computing entity and request a confirmation from the second computing entity that the circuit is acceptable for use in the multi-party computation. While a circuit is described in the context of the process 800 that is used as part of performing a cryptographic protocol for secure streaming check, the techniques described herein may be applicable to any suitable function, routine, program, circuit, computation task, etc., in which two or more computing entities perform a computation to generate an output based on a set of inputs wherein the inputs of a computing entity are not to be revealed or made available to other computing entities participating in the multi-party computation.

In an embodiment, the system determines 804, based on the circuit, an obfuscated circuit, wherein a set of obfuscated inputs are usable to determine a corresponding output of the circuit. The system may determine the obfuscated circuit based on techniques described elsewhere. The circuit may have various properties, such as a property that a set of inputs, if evaluated, results in an output. The set of inputs may be obfuscated to determine a set of obfuscated inputs and an obfuscated output, which may be included in a row of an obfuscated truth table. The set of obfuscated inputs and the obfuscated circuit may be usable to determine the corresponding output—thereby allowing the computing entity to determine the expected output of having evaluated a circuit using a particular set of inputs, but without necessarily exposing the set of inputs to the computing entity.

After determining the obfuscated circuit, the system may make 806 the obfuscated circuit available to an evaluation module (e.g., another computing entity) in any suitable manner. For example, the system may generate a truth table, obfuscate the truth table by re-ordering the rows of the truth table and encrypting each row of the truth table using a cryptographic key derived from the inputs of the corresponding row of the truth table, and provide the obfuscated truth table to the other computing entity by transmitting the obfuscated truth table encoded in one or more data packets via a network such as the Internet. In an embodiment, the system stores the obfuscated truth table at a network location and provides the network location so as to allow the recipient of the network location to access the obfuscated truth table (e.g., a message transmitted to the recipient may include a software token that grants access to the data indicated by the network location). The obfuscated truth table may be stored using any suitable storage system, such as a data storage service of a computing resource service provider. In an embodiment, the system defines a garbled circuit by a set of wires to a set of gates that results in a set of outputs that has a truth table that corresponds to the obfuscated truth table as described above, and the system also provides the garbled circuit to the other computing entity. Combinations thereof are also contemplated within the scope of this disclosure.

Figure 9:
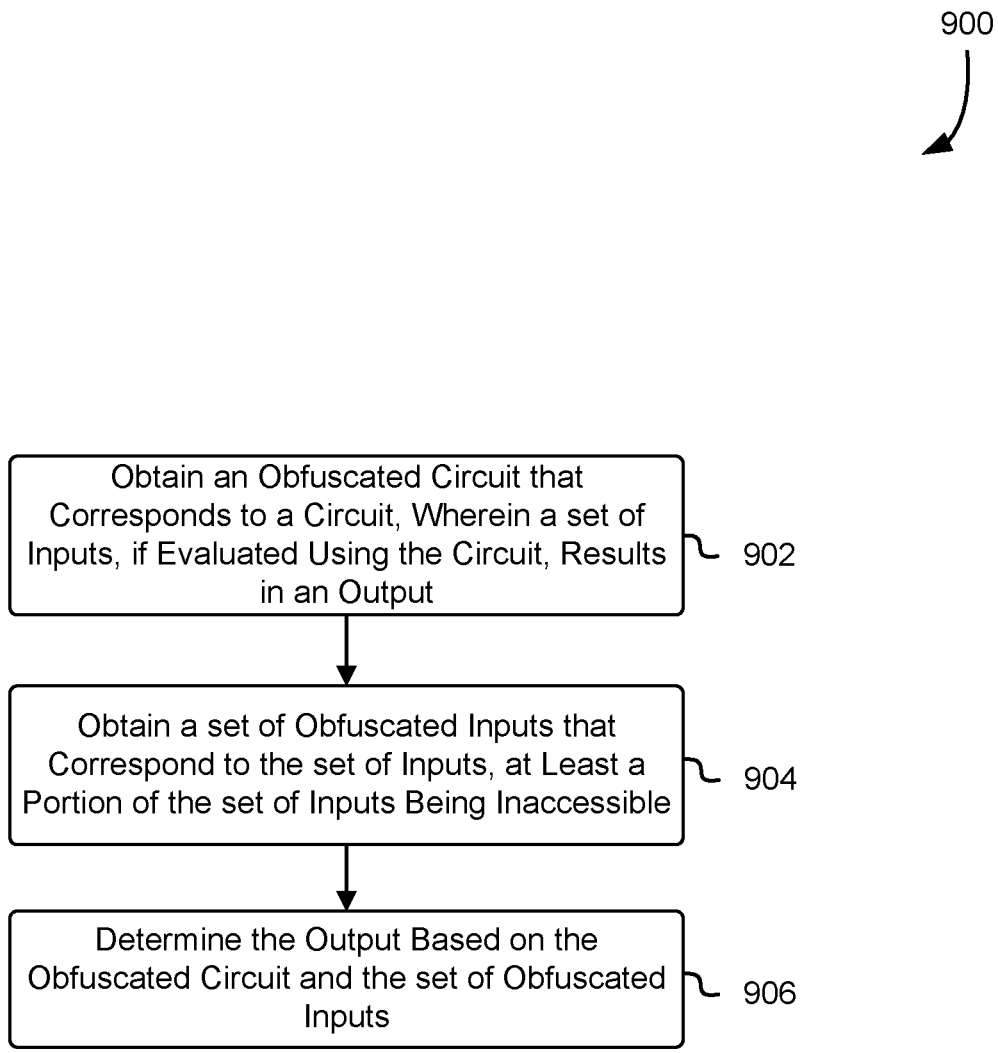
FIG. 9 shows an illustrative example of a process for performing at least part of a multi-party computation according to a cryptographic protocol that preserves the privacy of a data stream utilized to perform data processing and data analytics, in accordance with an embodiment.

FIG. 9 shows an illustrative example of a process 900 for performing at least part of a multi-party computation according to a cryptographic protocol that preserves the privacy of a data stream utilized to perform data processing and data analytics, in accordance with an embodiment. The process 900 may be implemented at least in part by an evaluation module. As an example, the process 900 may be performed by a data analytics service implemented on one or more computer servers of a computing resource service provider that are loaded with computer-executable instructions that, if executed by one or more processors, cause the one or more processors to perform the process. In some embodiments, a non-transitory computer-readable medium encodes instructions that, as a result of execution by one or more processors of a computer system, cause the computer system to perform the process. The process may be implemented in connection with the process described in FIG. 10, according to a cryptographic protocol that preserves the privacy of a data stream utilized to perform data processing and data analytics, in accordance with an embodiment.

The computer system implementing the process may obtain 902 an obfuscated circuit that corresponds to a circuit, wherein a set of inputs, if evaluated using the circuit, result in an output. In an embodiment, the obfuscated circuit is received via one or more data packets via a network such as the Internet. The obfuscated circuit may be generated and provided to the system according to techniques described elsewhere in this disclosure, such as processes discussed in connection with FIG. 8. An obfuscated circuit may comprise a set of connected logical gates and a set of inputs (e.g., input wires to the logical gates). In various embodiments, input wires to the logical gates generate output values, which may, in turn, be inputs to other logical gates—evaluation of the circuit resulting in one or more outputs. In an embodiment, evaluation of a circuit (e.g., an obfuscated circuit) results in a binary value—for example, if a function or circuit implements a set membership test, the output may be a binary value that corresponds to whether there is an intersection between a first data set and a second data set (e.g., a first input that is supplied by a first computing entity and a second input that is supplied by a second computing entity, wherein the computing entities do not have access to the data sets of their respective counterparties). In some embodiments, the obfuscated circuit is provided and the system is able to generate a truth table for the obfuscated circuit. In an embodiment, a computer system generates a truth table from a circuit, generates an obfuscated truth table, and provides the obfuscated truth table to the system performing the process 900. An obfuscated circuit may, in some embodiments, refer to an obfuscated truth table. In some embodiment, the set of inputs refer to values for input parameters or input wires that are used as inputs to logical gates of a circuit. The logical gates may, in turn, generate an output to the logical gate that may be the input to another logical gate, and so on. The output of the circuit may be the output generated from the evaluation of one or more logical gates.

In an embodiment, the system obtains 904 a set of obfuscated inputs that correspond to the set of inputs, wherein at least a portion of the set of inputs being inaccessible to the system. For example, an input of the set of inputs may be owned by (e.g., access to the input is controlled by) another computing entity of a multi-party computation. The inputs may be obfuscated according to an oblivious transfer protocol. In some embodiments, the system has access to a particular input (or, more generally, one or more inputs) of the set of inputs and obtains a corresponding obfuscated input from another computer system according to an oblivious transfer protocol.

The system may determine 906 the output based on the obfuscated circuit and the set of obfuscated inputs. In an embodiment, the set of obfuscated inputs are usable to determine cryptographic material that can decrypt an obfuscated output to determine the output (e.g., plaintext output). However, it should be noted in some cases that it is not necessarily the case that decryption is utilized, and in some cases, the obfuscated inputs are utilized in to compute the output without relying upon the use of cryptographic material to decrypt a ciphertext of the output.

Figure 10:
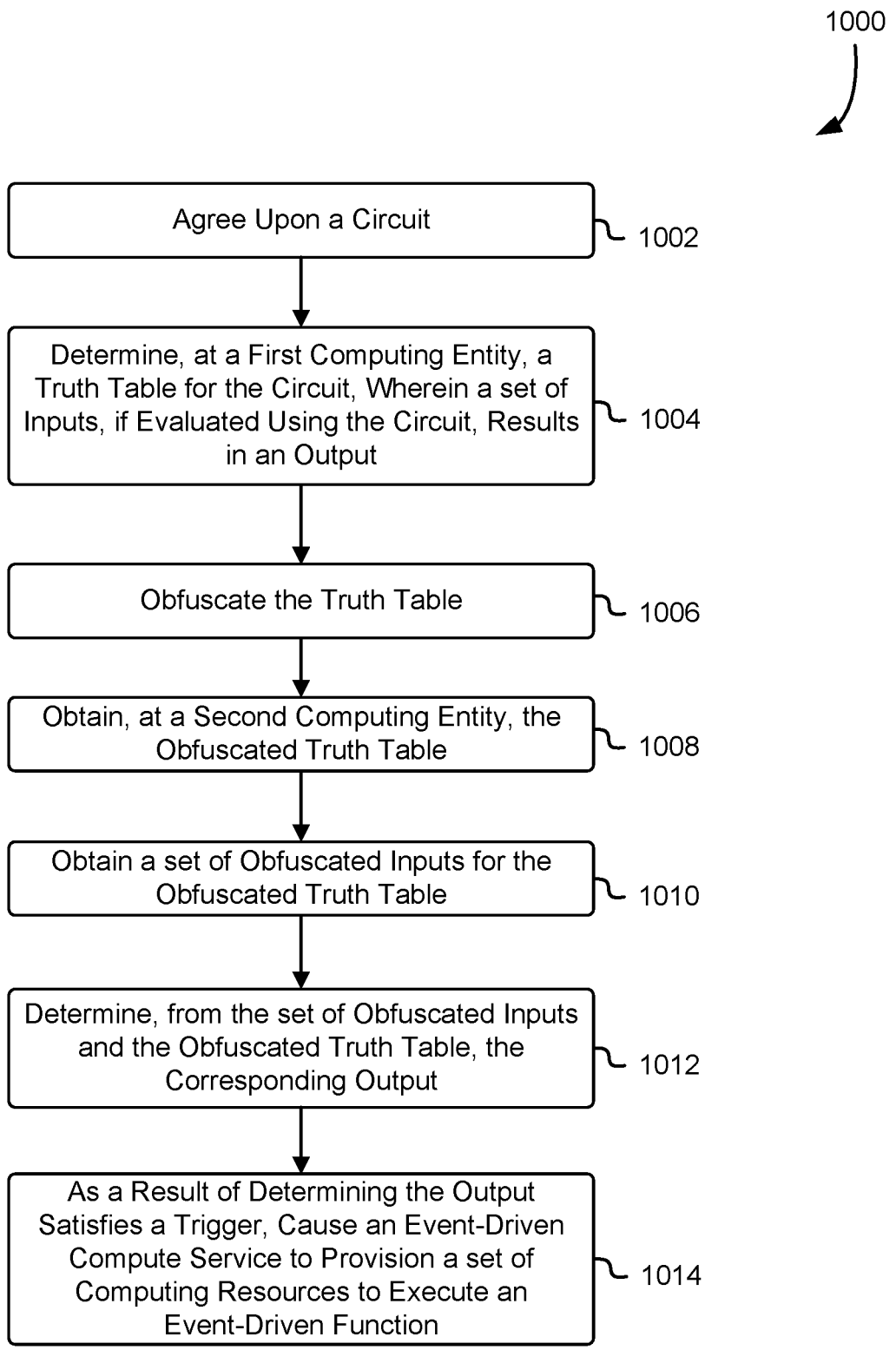
FIG. 10 shows an illustrative example of a process for performing at least part of a multi-party computation according to a cryptographic protocol that preserves the privacy of a data stream utilized to perform data processing and data analytics, in accordance with an embodiment.

FIG. 10 shows an illustrative example of a process 1000 for performing at least part of a multi-party computation according to a cryptographic protocol that preserves the privacy of a data stream utilized to perform data processing and data analytics, in accordance with an embodiment. The process 1000 may be implemented at least in part by one or more services of a computing resource service provider such as a data privacy service, a data analytics service, an event-driven compute service, and more. In an embodiment, the entire process is executed by computing resources of a computing resource service provider, wherein a portion of the computing resources are controlled and/or executed on behalf of a first computing entity and a different portion of the computing resources are controlled and/or executed on behalf of a second computing entity.

In an embodiment, a first computing entity and a second computing entity agree 1002 upon a circuit. In an embodiment, computing entities that implement a garbler module and an evaluation module mutually agree upon the circuit using any suitable protocol. The circuit may comprise a set of connected logical gates that generate an output whose value is controlled by a set of input wires to the set of logical gates. The set of input wires may be referred to as a set of inputs.

A first computing entity (e.g., a garbler module implemented by a data privacy service of the computing resource service provider) may determine 1004 a truth table for the circuit, wherein a set of inputs, if evaluated using the circuit, result in an output. A set of inputs {X, Y} to the circuit may generate a corresponding set of outputs {Z}. The truth table may be generated by creating a list of all combinations of possible inputs (e.g., for binary inputs A, B, and C, the truth table may have a total of $2^3=8$ rows that correspond to the combinations of possible input values) and, for each combination of inputs, evaluating the circuit to determine the respective outputs. Each row of the truth table may correspond to a set of inputs and an output, wherein the set of inputs, if evaluated using the circuit, results in the output being generated as the result of the circuit from the particular values supplied by the set of inputs.

The first computing entity may obfuscate 1006 the truth table by, for example, encrypting each row of the truth table using different cryptographic material and then re-ordering the rows of the truth table according a random or pseudo-random process, thereby generating an obfuscated truth table. In an embodiment, the first computing entity provides the obfuscated truth table to a second computing entity.

In an embodiment, the second computing entity (e.g., an evaluation module implemented by a data analytics service of the computing resource service provider) receives or otherwise obtains 1008 the obfuscated truth table. The obfuscated truth table may be parsed and obtained from one or more data packets or messages (e.g., including intermediate steps to decompress and/or re-construct the obfuscated truth table from constituent parts). In an embodiment, the system receives a network location such as a universal resource identifier (URI) that refers to a network location where the obfuscated truth table can be accessed—access to the network location, in some embodiments, is contingent upon the system providing a set of credentials (e.g., user permissions, a security token) which can be authenticated and/or authorized, such as by an access management service. Security permissions may be such that the second computing entity lacks access to input data that is controlled, owned, or otherwise accessible to the first computing entity. In an embodiment, the second computing entity receives or otherwise obtains 1010 a set of obfuscated inputs that are based on a set of inputs. The input data may be controlled by one or more computing entities separate from the second computing entity (e.g., logically separated, such as by a trust boundary) such that the second computing entity lacks access to at least a portion of the set of inputs. For example, computation of the circuit may require N inputs, and the second computing entity lacks access to N−1 of the inputs.

Upon receiving the obfuscated circuit inputs, the second computing entity is able to identify a row of the obfuscated truth table that corresponds to the obfuscated inputs and, furthermore, is able to use the first and second obfuscated circuit input to determine 1012 the output or result of the circuit evaluated using the circuit input data without revealing the values of the circuit inputs—in other words, the second computing entity is able to determine the result of evaluating the circuit without necessarily having access to all inputs to the circuit (e.g., the second computing entity lacks information sufficient to determine at least some of the (un-obfuscated) circuit input data). In an embodiment, the rows of the obfuscated truth table are encrypted and each row of the obfuscated truth table (or a portion thereof, such as only the output for the respective row) is decryptable based at least in part on having access to the respective obfuscated circuit inputs corresponding to the row.

As a result of evaluating an obfuscated circuit (e.g., by evaluating an obfuscated truth table using a set of obfuscated circuit inputs to determine an output) the second computing entity may generate an alarm, alert, notification, message, or any other suitable trigger mechanism to an event-driven compute service, thereby causing 1014 the event-driven compute service to provision a set of computing resources to execute an event-driven function. The event-driven compute service may be any suitable computing entity, such as an on-demand compute service of a computing resource service provider that provisions, loads, and executes code based on a trigger. For example, an alert may be sent based on the circuit determining set membership in common between two or more different sets of data that are controlled by different computing entities which lack access to (e.g., are unable to access plaintext or readable versions of) the sets of data of other computing entities.

As used herein, the terms "private key" and "public key" may be used to refer, respectively, to private and public keys used as part of asymmetric cryptography ("public key cryptography"). Asymmetric cryptography refers to a class of cryptographic protocols wherein the private key and public key may be mathematically linked. In public key cryptography, there is no requirement that parties exchange a shared secret. Rather, a public key may be published and may be generally available (even to untrusted parties), whereas the private key should not be revealed to untrusted parties. The key pair (of the corresponding private key and public key) may be used to perform cryptographic operations. For example, a public key may be used to encrypt a plaintext message, resulting in a ciphertext, and the corresponding private key may be used to decrypt the ciphertext, resulting in the original plaintext message. As a second example, a private key may be used to generate a digital signature authenticating a message, and the corresponding public key may be used to verify that the digital signature is correct and thus, that the message is authentic. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted.

Various systems may be used to implement aspects of the invention in accordance with an embodiment. As will be appreciated, although a web-based system is used for purposes of explanation, different systems may be used to implement an encrypted search provider, as appropriate. An encrypted search client may be implemented using an electronic client device, which includes any appropriate device operable to send and/or receive requests, messages, or information over an appropriate network and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network may be any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, and the system includes a web server for receiving requests and serving content in response thereto, although for other networks an alternative device serving a similar purpose could be used as would be apparent to one of ordinary skill in the art.

Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

A data store or database may include several separate data tables, databases, data documents, dynamic data storage schemes, and/or other data storage mechanisms and media for storing data relating to a particular aspect of the present disclosure. In an example, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device. Continuing with the example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system may be a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are described. Thus this description should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or a web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various examples, information may be acquired, obtained, or received at one computer system from another computer system or entity. Correspondingly the information may be provided, transmitted, sent, uploaded, or submitted by the other computer system or entity. Those skilled in the art will appreciate that information may be transferred between computing entities or computing system systems in a variety of ways, and that many of those ways may be substituted for each other without significantly impacting the operation of the system. For example, information can be transferred between one entity and another using a procedure call where the information is stored on a stack structure associated with the procedure call, and retrieved from the interior of the called procedure. The called procedure may, in certain embodiments, store a return value on the stack which is then read by the caller when the procedure is complete. In another example, information may be transferred from one entity to another via a computer network in the form of a network packet or is information within network stream (such as a TCP connection or persistent logical connection). Other ways of transferring information between computing entities or computing systems include remote procedure calls, message-based systems, shared memory regions, or data stores or databases that are accessible by multiple users. In general, in the present document, obtaining, providing, receiving, transmitting, sending, or acquiring information to or from a computer system or entity may be accomplished by any of the above methods unless otherwise described.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a non-empty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any non-empty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium stores instructions and a main CPU executes some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implements an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a requester, a request to search an encrypted database;
   selecting, based on an aggregate index, a portion of the encrypted database and a portion of a full index of the encrypted database;

storing the portion of the encrypted database and the portion of the full index to a data storage device on a mobile computer system;

causing the mobile computer system to generate an encrypted search result using the portion of the encrypted database and the portion of the full index while the mobile computer system is physically separate from the encrypted database and shipping to the requester; and providing the encrypted search result to the requester by sending the mobile computer system to the requester.

2. The computer-implemented method of claim 1, further comprising:

obtaining physical address information associated with the requester;

associating the physical address information to the mobile computer system; and shipping the mobile computer system to a physical address indicated by the physical address information.

3. The computer-implemented method of claim 1, wherein the mobile computer system includes:

a battery including a sensor that measures an amount of power stored in the battery; and a set of environmental sensors that includes at least one or more of a temperature sensor, a pressure sensor, a humidity sensor, or an accelerometer.

4. The computer-implemented method of claim 1, further comprising:

estimating an amount of time for the mobile computer system to be received by the requester;

estimating an amount of processing to be performed by the mobile computer system to produce the encrypted search result; and selecting the mobile computer system from a group of mobile computer systems based on the amount of time and the amount of processing.

5. A system, comprising:

one or more processors; and memory that stores computer-executable instructions that, if executed, cause the one or more processors to:

obtain a request to search an encrypted data store;

generate an intermediate result based on the request and the encrypted data store;

transfer the intermediate result to a portable computer system;

configure the portable computer system to process the intermediate result into an encrypted search result; and provide the encrypted search result by causing the portable computer system to be shipped.

6. The system of claim 5, wherein the computer-executable instructions further cause the one or more processors to:

estimate an amount of time required by the portable computer system to determine the encrypted search result; and select, from a set of shipping options, a mode of shipment for shipping the portable computer system based on the amount of time.

7. The system of claim 5, wherein: the system maintains an aggregate index and a full index; and the intermediate result includes a portion of the full index and a portion of the encrypted data store.

8. The system of claim 5, wherein the computer-executable instructions further cause the one or more processors to:

determine an amount of processing required to convert the intermediate result to the encrypted search result; and select the portable computer system from a pool of available portable computer systems based at least in part on the amount of processing required.

9. The system of claim 5, wherein the computer-executable instructions further cause the one or more processors to:

estimate an amount of time it will take for the portable computer system to arrive at a requester; and select the portable computer system from a pool of available portable computer systems based at least in part on an amount of battery power available to each portable computer in a pool of available computer systems.

10. The system of claim 5, wherein the computer-executable instructions further cause the one or more processors to:

generate a set of executable instructions that, as a result of being executed by the portable computer system, cause the portable computer system to generate the encrypted search result from the intermediate result; and provide the set of executable instructions to the portable computer system.

11. The system of claim 5, wherein the computer-executable instructions further cause the one or more processors to:

obtain a credential associated with the request; and provide the credential to the portable computer system.

12. The system of claim 5, wherein:

the request is received from a requester via a computer network; and the request identifies a mode of shipment to return the encrypted search result to a recipient.

13. A system, comprising:

a portable power source;

one or more processors;

a data storage device; and memory that stores computer-executable instructions that, if executed, cause the one or more processors to:

store a portion of an encrypted database and a portion of an index associated with an encrypted search request to the data storage device, the portion of the encrypted database and the portion of the index provided by an encrypted search provider in response to the encrypted search request submitted by a requester;

generate an encrypted search result from the portion of the encrypted database and the portion of the index; and provide the encrypted search result to the requester.

14. The system of claim 13, wherein:

the system includes a temperature sensor that measures a temperature associated with the system; and the instructions further comprise instructions that, as a result of being executed by the one or more processors, cause the computer system to suspend processing operations when the temperature exceeds a threshold value.

15. The system of claim 13, further comprising:

a shock sensor; and wherein the instructions further comprise instructions that, as a result of being executed by the one or more processors, cause the system to, in response to detecting that a force exerted on the system exceeds a threshold amount, suspend processing of intermediate results until the force exerted on the system subsides.

16. The system of claim 13, wherein the instructions further comprise instructions that, as a result of being executed by the one or more processors, cause the system to:

determine an amount of energy stored in the portable power source; and as a result of determining that the amount of energy is below a threshold amount, suspend production of the encrypted search result.

17. The system of claim 13, wherein the instructions further comprise instructions that, as a result of being executed by the one or more processors, cause the system to:

before the encrypted search result is produced, produce a second intermediate result; and provide the second intermediate result to the requester.

18. The system of claim 13, wherein the instructions further comprise instructions that, as a result of being executed by the one or more processors, cause the system to:

determine an amount of energy stored in the portable power source; and provide an indication of the amount of energy to the encrypted search provider.

19. The system of claim 13, wherein the instructions further comprise instructions that, as a result of being executed by the one or more processors, cause the computer system to:

obtain, from the encrypted search provider, information that enables the system to authenticate the requester; and use the information to authenticate the requester as a condition of providing the encrypted search result.

20. The system of claim 13, wherein the system includes an atmospheric pressure sensor, a humidity sensor, a moisture sensor, a g-force sensor, a global positioning sensor, a shock sensor, and a timer.

21. The system of claim 13, wherein the instructions further comprise instructions that, as a result of being executed by the one or more processors, cause the system to:

delete the encrypted search result;

delete the portion of the encrypted database; and delete the portion of the index.

22. The system of claim 13, wherein the data storage device is comprised of a plurality of separate pieces that are shipped to the requester at different times and via different physical routes.

* * * * *